(12) United States Patent
Prudhomme

(10) Patent No.: US 6,875,002 B2
(45) Date of Patent: Apr. 5, 2005

(54) OSCILLATING GUIDE CAGE

(75) Inventor: Andrew D. Prudhomme, Seneca Falls, NY (US)

(73) Assignee: Pearl Technologies, Inc., Savannah, NY (US)

( * ) Notice: Subject to any disclaimer, the term of this patent is extended or adjusted under 35 U.S.C. 154(b) by 263 days.

(21) Appl. No.: 10/298,303

(22) Filed: Nov. 18, 2002

(65) Prior Publication Data

US 2004/0096531 A1 May 20, 2004

(51) Int. Cl.⁷ .............................................. B29C 47/90
(52) U.S. Cl. ................ 425/72.1; 425/326.1; 425/387.1; 425/377; 425/378.1; 425/382.3
(58) Field of Search ............................. 425/326.1, 72.1, 425/387.1, 377, 378.1, 382.3

(56) References Cited

U.S. PATENT DOCUMENTS 4,650,407 A * 3/1987 Taguchi ...................... 425/72.1
6,196,827 B1 3/2001 Pottorff ..................... 425/326.1

* cited by examiner

Primary Examiner—Joseph S. Del Sole
(74) Attorney, Agent, or Firm—Bernhard P. Molldrem, Jr.

(57) ABSTRACT

An external stabilizer or guide cage for plastic film extrusion has an upper frame comprised of a ring and structure for rotatably supporting the ring. A lower frame is suspended from the ring of the upper frame, and is positioned such that the lower frame surrounds the extruded tube. The lower frame can employ one or several banks of guide arms that keep the tube aligned axially as the tube is drawn upwards. The arms on the lower frame define an iris aperture, or a stack of iris apertures. The arms include channels for coolant flow. Heat transfers from the film to the guide arm. The upper frame includes a drive for rotating the ring and the lower frame of the guide cage over a predetermined arc, e.g., 60 degrees, to compensate for gauge variations in the film.

14 Claims, 4 Drawing Sheets

OSCILLATING GUIDE CAGE

BACKGROUND OF THE INVENTION

The present invention relates to the fabrication and processing of plastic film, and is more specifically directed to stabilizers for maintaining a tubular extrusion of blown plastic film, that is, a bubble, on a predetermined path during the extrusion process. The invention is more particularly concerned with improvements to an external guide or stabilizer arrangement that permits the aperture of the stabilizer to be adjusted, and which minimizes or compensates for the problem of gauge, or small variations in the thickness of the film caused by the passage of the film through the stabilizer.

Polyethylene film or films of other thermoplastic materials are produced using a blown film process, in which molten thermoplastic material is fed to an annular extrusion die and the latter produces a tubular extrusion, i.e., a bubble, of the material, which is drawn upwards and solidifies into film. An air jet incorporated in the die injects air into the interior of the extrusion to inflate the bubble or tube. The film in the extrusion is initially somewhat fluid and inflates to a larger diameter with a correspondingly thinner wall, cooling and solidifying when a predetermined thickness is reached. The process is controlled and adjusted so that the film has a uniform thickness, and this basic process is well known in the art. The tubular extrusion is drawn upwards and flattened between a pair of nip rollers that are positioned above the die. Typically, a collapsing frame is provided to urge opposite sides of the tubular extrusion towards one another just before the tube reaches the nip rollers. The collapsing frame may consist of a pair of opposed arrays of horizontal collapsing boards of any of a number of well-known configurations, and one suitable arrangement is discussed in U.S. Pat. No. 4,943,226, granted Jul. 24, 1990.

As mentioned before, it is important that the thickness, as well as strength and other properties of the produced film be as uniform as possible. It is also necessary to the quality of the film that it be relatively free of weak regions and tears. For those reasons stabilizer arrangements are used to keep the tubular extrusion confined to a well-defined travel path as it proceeds from the die to the nip rollers. Guide cages or other external stabilizers can be positioned outside the bubble for this purpose. In some cases internal guide members can be disposed atop the extrusion die and within the bubble, both to prevent the tubular extrusion from drifting off the axis of travel and also to assist in the direction of air flow within the bubble.

A typical external stabilizer takes the form of a cage or frame and a series of banks of bowed arms that are positioned at intervals around the tubular extrusion. In some arrangements, each arm can carry a row of rollers made of a PTFE (Teflon) material, with the arms being positioned just out of contact with the bubble, or in light contact with it. This arrangement has limitations, due to the abrasiveness of the plastic extrusion, and due to the need to position the rollers along a curve. The use of rollers makes it difficult or impossible to supply coolant to the arms of the stabilizer, and this limits the ability to manage and control heat in the bubble. The rollers also make this type of stabilizer expensive to build and to maintain. The stabilizers can be of a variable aperture design, with an array of arms configured as a variable iris aperture, typically employing bowed arms of rollers. One example of this is shown in U.S. Pat. No. 4,815,957.

Another external stabilizer is described in U.S. Pat. No. 5,700,479, in which the stabilizer employs non-rotating bow arms of a light weight aluminum construction with wear covers of a wear-resistant, low-friction plastic material. These can be arranged either in a bank of arms or as a spiral or helical member.

A recognized problem in the blown film art is that blown film has different stretch and strength characteristics in the axial or machine direction from what is achieved in the transverse direction, i.e., circumferentially around the extrusion. This occurs because it has been difficult to control the expansion of the bubble in both directions at the same time. Ideally, the strength in the machine direction, or MD, should be the same as the strength in the transverse direction, or TD. Stabilizing the position of the extrusion or bubble helps in this regard. Also, controlling rotation of the bubble as it rises will affect these properties, with film materials of different composition or of different thickness requiring more or less rotation. Control of the temperature of the film during the extrusion process is also an important means in achieving uniformity, but little attention has been paid to finding ways for the external guide cage to assist in heat management.

One approach to an external guide cage with control of temperature in the guide arms is disclosed in U.S. Pat. No. 6,196,827. In that arrangement, there are a number of banks of extruded guide arms which can be pivoted to change the size of the iris aperture, and with diameter of the aperture changing from one level or bank of arms to the next. The use of a light-weight metal extrusion permits the arm to be of a dual tube construction so that a closed coolant flow path can be provided in each arm. A flow of coolant, such as water, can be provided through channeling in the interiors of the extruded metal arms for controlled cooling. Each arm can have a profile so as to accept a low-friction wear cover. Coolant supply and return piping and other hardware can be coupled to each arm at its pivot end.

Because of the iris shape of the aperture, there is closer contact with the bubble at some locations around the bubble than at others, and this can result in slight differences in the amount of heat transfer from the bubble to the guide arms. As a result of this, the extruded film can have slight variances in thickness in the TD corresponding to the locations where the arms are just out of contact with the film. These variations can be on the order of a fraction of a mil, but when the film is rolled onto a mandrel these gauge variations accumulate if they are all at the same location on the circumference of the bubble. Because the roll of film can comprise many thousands of turns, the gauge variation can accumulate to result-in circumferential ridges or hollows of significant size

OBJECTS AND SUMMARY OF THE INVENTION

Accordingly, it is an object of this invention to provide an external guide cage for a blown film operation that-achieves good heat management and avoids problems from gauge variation, and which avoids other drawbacks of the prior art.

It is another object of the invention to increase control over heat and expansion of the extruded bubble, so as to achieve greater uniformity in the resultant films.

According to one aspect of the present invention, an external stabilizer arrangement can be employed in a plastic film blowing apparatus in which a tubular die, fed with a supply of molten thermoplastic polymer, extrudes a tube of the molten polymer. The die also injects air into the extruded tube to inflate the tube and expand the tube into a film of a desired thickness. A pair of nip rollers and a collapsing board, or equivalent means, are positioned above said die for drawing the tube vertically upward along a vertical axis and collapsing and flattening the film. Then the flattened film can be wound onto a mandrel. In a preferred embodiment, the external stabilizer arrangement has a first, upper frame and a second, lower frame. The upper frame has a ring through which the extruded tube passes, and support structure for rotatably supporting the ring. A rotary member other than a ring can be used to support the lower frame, so long as an open passage is provided for the film extrusion. The lower frame is suspended from the ring of said upper frame, and is positioned such that the lower frame surrounds the extruded tube above the die. The lower frame employs one or several stacks of guide arms that keep the tube aligned in a predetermined path as the tube is drawn upwards. The arms pivotally arranged on the lower frame so as to define an iris aperture, or a stack of iris apertures. Each of the arms includes a channel for coolant flow. As the bubble passes through the iris aperture, a portion of each arm is in contact with the extruded tube. This results in some heat transfer from the film to the guide arm. However, as discussed above, there is a need to control the gauge variations in the film that can result from the unequal contact of the surface arms with the film. Accordingly, in the preferred embodiment the upper frame includes means for rotating said ring over a predetermined arc in respect to the axis of extruded tube. In this-way, the angular positions of the portions of the arms that contact the tube change as the tube passes vertically through the external stabilizer. This compensates for gauge variations in the film. The arc can be a 30 to 60 degrees, or can be 90 degrees or more. It is also possible in some configurations for the guide cage to rotate more than a full 360 degrees. Preferably, the ring from which the guide cage is suspended rocks or oscillates at a low speed back and forth over the arc, e.g. back and forth 60 degrees.

Preferably the mechanism for suspending the lower frame from the ring of the upper frame employs a plurality of threaded rods that are rotatably supported on the upper frame ring. These threaded rods extend vertically downward through female threaded receptacles in the lower frame. A belt drive or other drive mechanism on the ring rotates the threaded rods some selected amount to raise or lower the frame and adjust its the elevational position relative to the extruded bubble.

The ring of the upper frame can be in the form of an annular channel, e.g., having two generally cylindrical flange walls and a flat annular web or plate, with the threaded support rods being suspended through penetrations in the flat annular web, and with the belt drive being situated in the space between the two cylindrical flange walls. The drive for oscillating or rocking the ring can include a belt drive mounted on the support structure of the upper frame and with its belt traveling around the outer rim of the ring.

The above and many other objects, features, and advantages of this invention will become apparent from the ensuing description of an exemplary embodiment, which should be read in conjunction with the accompanying Drawing.

DETAILED DESCRIPTION OF THE PREFERRED EMBODIMENTS

Figure 1:
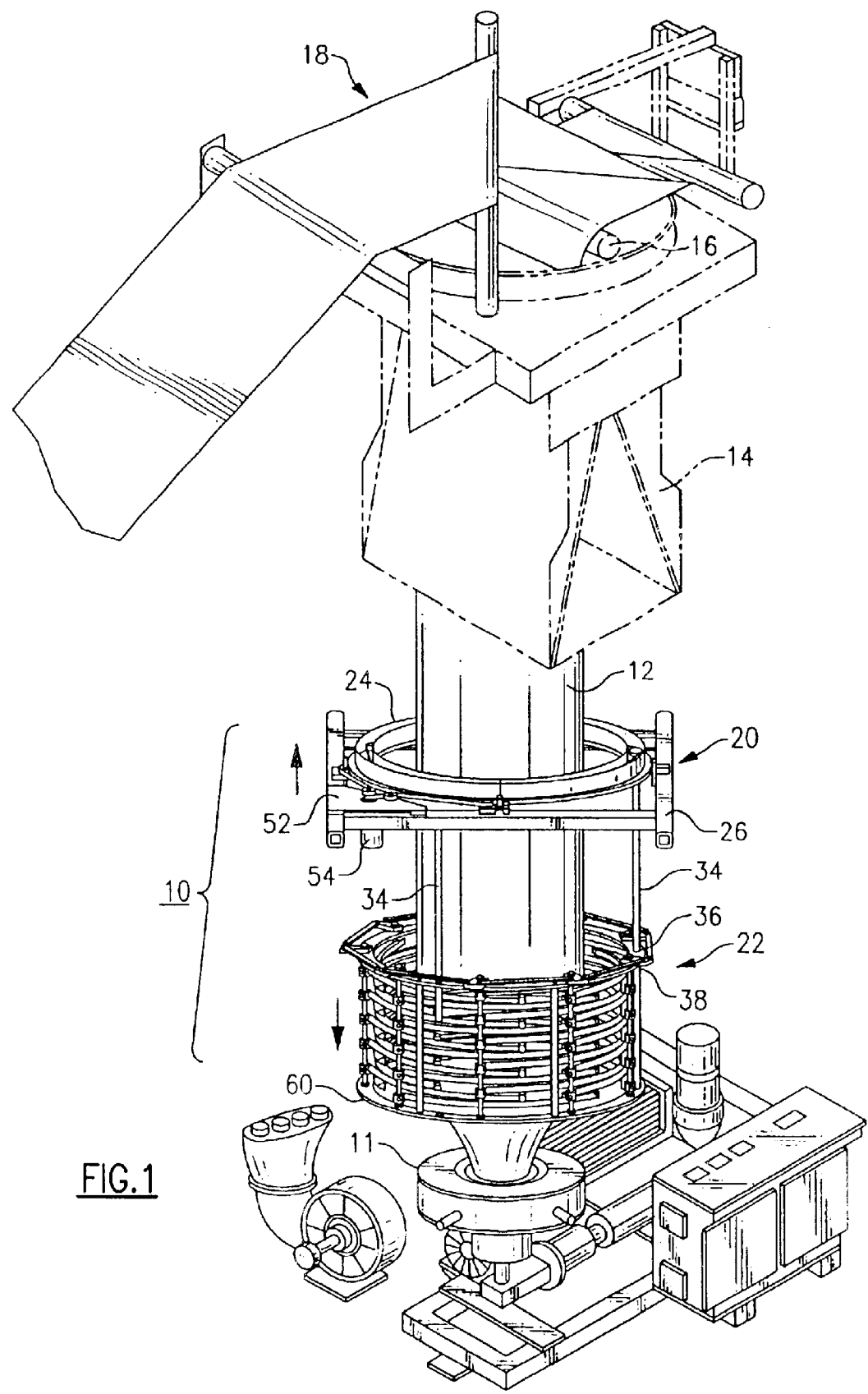
FIG. 1 is a perspective view a blown film extrusion arrangement employing an external stabilizer or sizing cage according to one preferred embodiment of the invention.

With reference to the Drawing, FIG. 1 illustrates a blown film extrusion assembly that includes an external stabilizer arrangement 10 of this invention. The assembly may incorporate other guides such as an internal stabilizer (not shown). Here an extrusion die 11 is supplied with a molten thermoplastic material, e.g., polyethylene, polypropylene, PVC, or another thermoplastic resin. The die 11 has a circular or annular opening, and an air injection jet is disposed within the opening. The die 11 produces an extruded tube 12 or bubble of the molten material, which is drawn upwards and inflates until the wall of the extrusion is expanded to a design thickness. The film can typically be in a range from a few tenths of a mil to several mils, depending on the intended end use for the plastic film. In many instances, the die 11 is rotated during extrusion so as to avoid longitudinal weak areas and to increase the film strength in the transverse direction (TD). As the film is drawn upwards, the tube 12 must be flattened, and so a collapsing frame 14 is provided well above the die 11 to urge opposite sides of the tubular extrusion 12 towards one another. A suitable design for a collapsing frame is described in U.S. Pat. No. 4,943,226. A pair of nip rollers or pinch rollers 16 are disposed above the collapser to flatten the tube into multiple thicknesses of film. The nip rollers 16 also draw the extrusion or bubble 12 upwards at a controlled rate. The elevation of the nip rollers above the die 11 can be forty feet or more. A subsequent arrangement of guide rollers 18 directs the travel of the film to a processing stage where the web of film exiting the guide rollers is wound upon a mandrel (not shown).

As the tubular extrusion 12 is drawn vertically upwards, the air within the tube expands the tube outward until the thermoplastic material sets. Typically there is a so-called "frost line" on the moving extrusion at the vertical position where the plastic has cooled and can no longer be expanded significantly.

Because of the great distance from the die 11 to the nip rollers 16, the travel path of the tubular extrusion can drift away from the vertical axis between the die and rollers. This drift can lead to unacceptable irregularities, e.g., weak regions, tears, or pulls in the film product. For that reason, the blown film arrangement typically will employ means to stabilize the path of vertical travel of the extrusion 12. This can be below the frost line where expansion occurs, as well as above the frost line. These means can include internal stabilizers, external stabilizers, or some combination of the two. In this embodiment, the external stabilizer arrangement 10 includes a upper support frame 20 surrounding the bubble or extrusion 12 and a lower stabilizer frame 22 that is suspended from the upper support frame 20, and which also surrounds and guides the extrusion 12.

Figure 2:
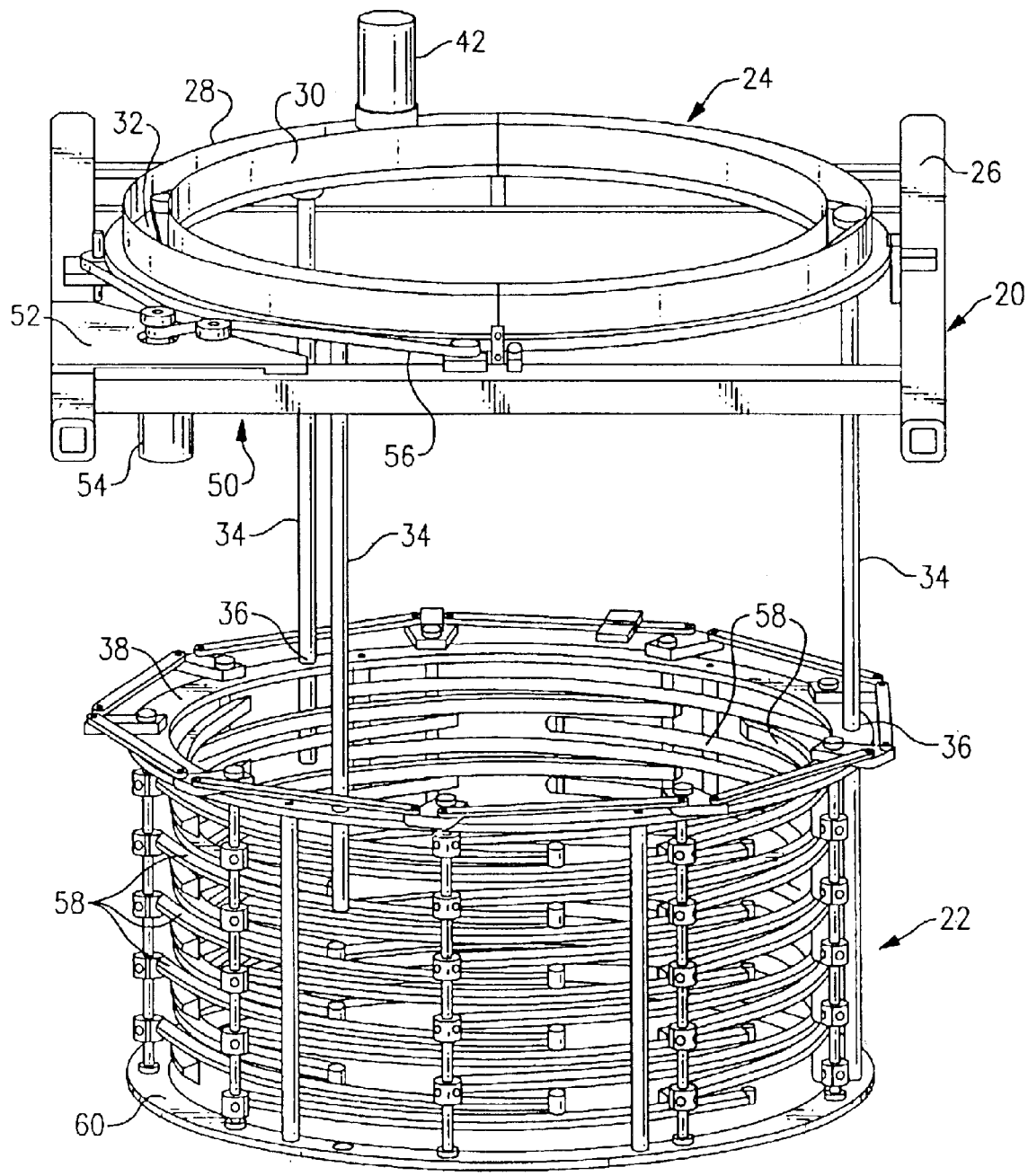
FIG. 2 is a perspective of the guide cage or sizing cage of this embodiment of the invention.

As illustrated in FIG. 2, the upper support frame 20 comprises a horizontal support ring 24 that is rotationally mounted on a platform 26. Here, the platform is formed of an arrangement of horizontal beams. The structure for supporting the platform 26 above the workroom floor is omitted in this view. The ring 24 is in the form of an annular channel, with an outer cylindrical wall 28, and inner cylindrical wall 30, and a flat, horizontal floor plate or web 32. There are three vertical threaded support rods 34, 34, 34 suspended from the annular floor plate 32 of the ring 24, and these pass through respective female threaded receptacles 36 in an upper ring 38 of the lower frame 24. The rods 34 can be rotated clockwise or counterclockwise to raise or lower the lower frame 24 relative to the upper frame 20.

Figure 3:
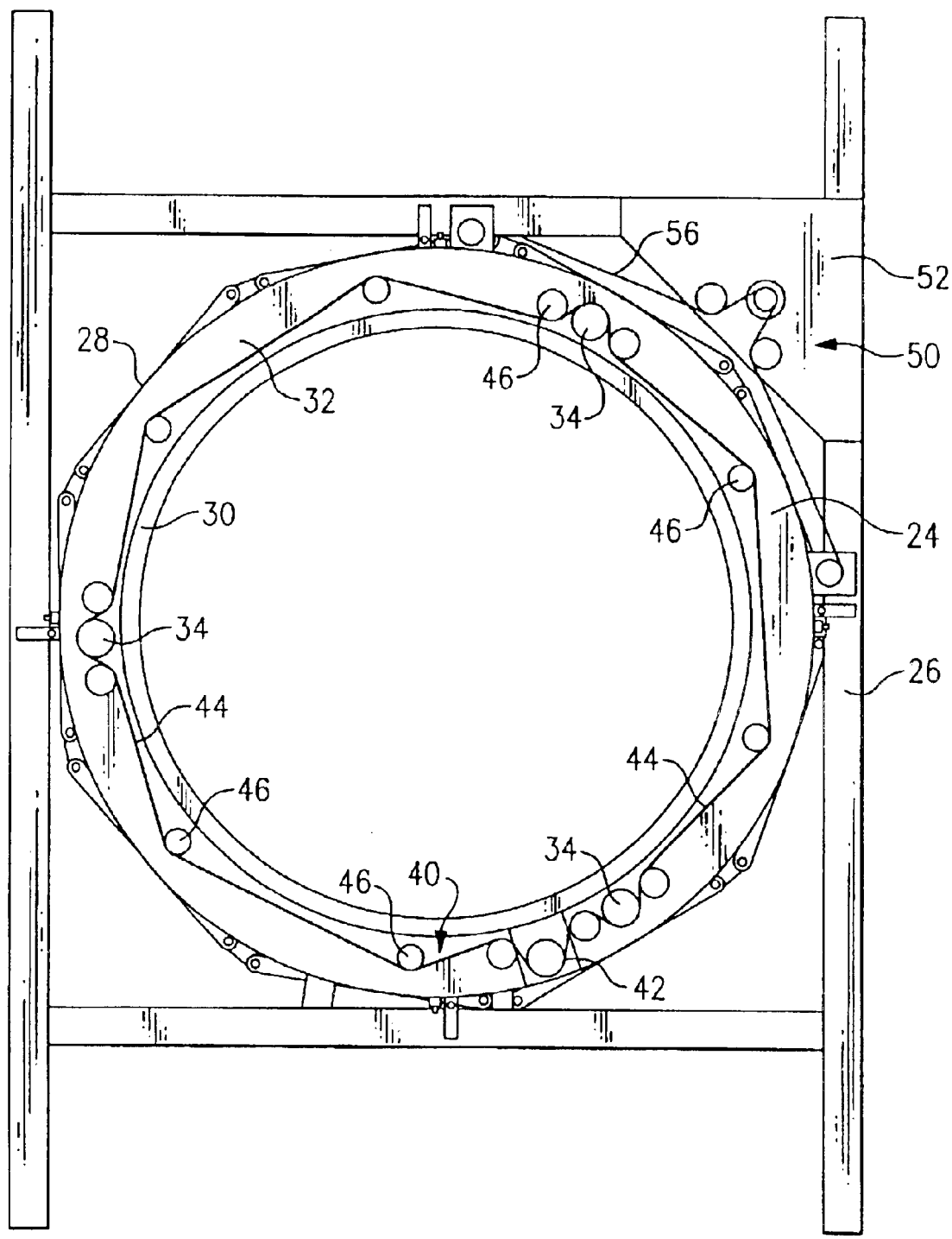
FIG. 3 is top plan view of this embodiment.
Figure 4:
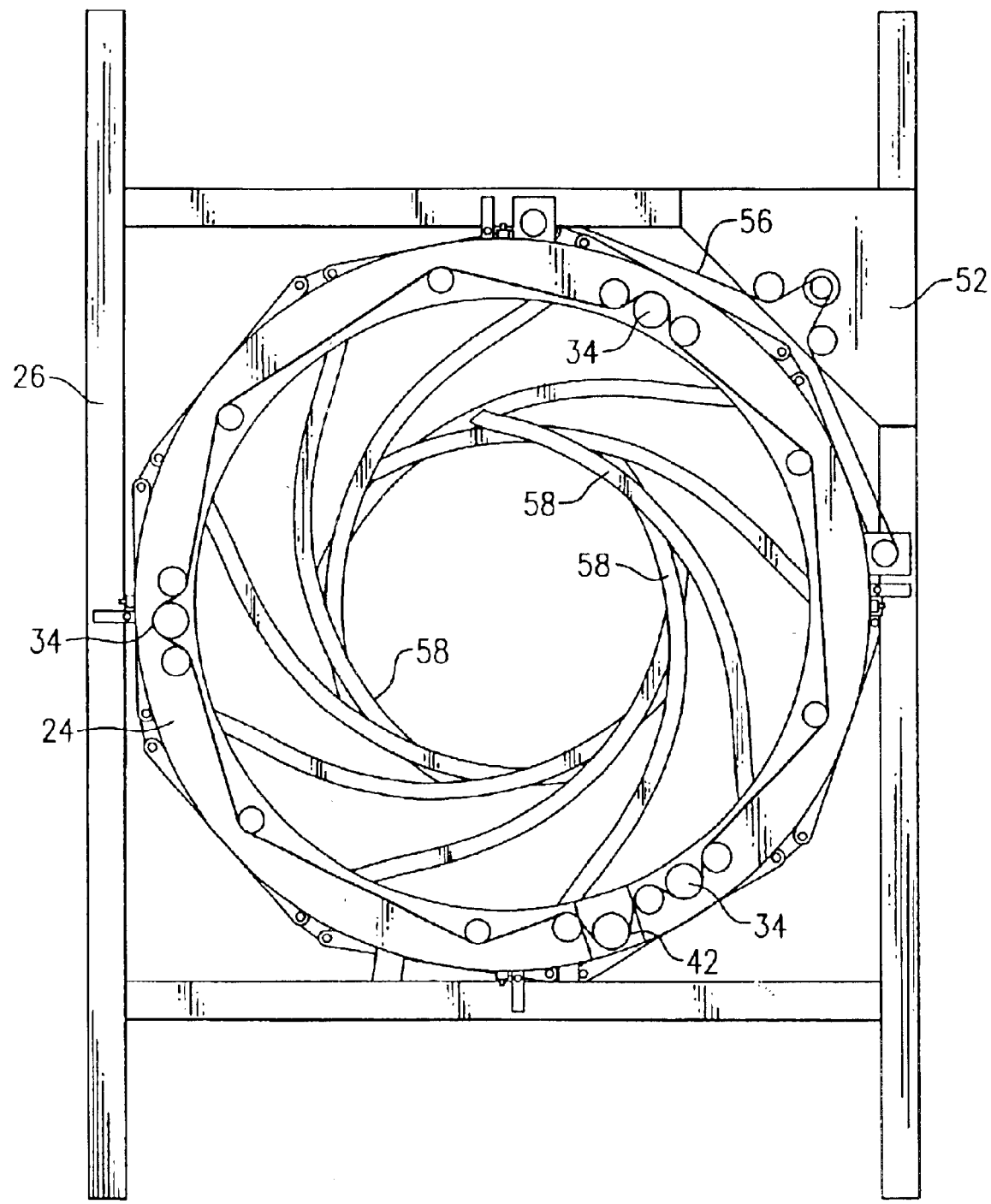
FIG. 4 is another top plan view of this embodiment.

A belt drive arrangement 40 for rotating the three vertical threaded rods 34, shown also in FIGS. 3 and 4, is situated on the upper side of the plate 32 of the ring 24, between the cylindrical walls 28, 30. A motor 42, which can be electric, pneumatic, or hydraulic, is mounted on the ring 24, and this drives a belt 44 which travels around various guide pulleys 46 situated between the two cylindrical walls, and the belt passes over drive wheels for each of the rods 34, as shown.

A drive mechanism 50 for rocking or oscillating the ring 24 can also comprise a belt drive. Here, a support gusset 52 is situated at one corner of the platform 26 of the upper frame, and a drive motor 54 is supported on the gusset 52. The motor 54 drives a belt 56 that passes around the circumference of the ring 24. Depending on the design, the belt can engage an outer edge of the flat annular floor plate 32 of the ring, or can engage the outer cylindrical wall 28. The motor 54 can be electrically, pneumatically, or hydraulically powered. Also instead of a belt, a chain drive may be used, or a gear or other drive system can be used to oscillate the ring 24 of the upper frame 20, and with it to oscillate the lower frame 22, i.e., the guide cage. While not shown here, there may be optical, electromechanical, or other servo detector devices to control the rotation of the ring in one direction and then the other. As discussed previously, the ring 24 and lower frame 22 of the guide cage 10 are oscillated over some preset arc, e.g., 45 to 60 degrees. This can be any amount of arc, and can be a partial rotation, a full rotation, or more than one full rotation in some cases. The speed of rotation should also be rather low, as its purpose is to offset the location of any gauge variation on the film a small amount from one turn to the next.

The lower frame 22 of the guide cage 10 can be configured as shown in U.S. Pat. No. 6,196,827, although the invention is not limited only to that style of guide cage. As shown in FIG. 2 and also in FIGS. 3 and 4, the lower frame comprises an array of pivoted guide arms 58 supported in a stack of annular banks of arms 58 distributed around the axis of the bubble 12 and supported between the upper ring 38 and a lower ring 60 of the lower frame 22. At the pivot end of each guide arm 58 are inlet and outlet means for connecting hoses or pipes for liquid coolant that circulates through the arm. The banks of arms rotate together to define an iris aperture of a desired aperture size. Each bank of arms 58 can be rotated between a full open position, as shown FIG. 3, and a choked or narrowed position as shown in FIG. 4, or to an intermediate position. Each bank can have a different iris aperture so that the size gradually increases along the vertical axis to accommodate for changes in bubble diameter as the extruded bubble inflates.

As shown, e.g., in FIG. 4, the arms 58 are of a fixed shape, and the iris aperture is not truly round for every possible iris aperture, so that there are points along the circumference of the extruded bubble 12 that will be in contact with the guide arms 58 and point that will be out of contact. The amount of heat transfer from the bubble to the cooled arms 58 will be slightly different at different points around the circumference of the bubble. This means that the amount of expansion will vary slightly. This amount is generally insignificant in respect to the quality of the film or for end products fabricated from the film. However, when the film is wound on a spool or mandrel, the gauge variation can result in ridges or bumps unless the position of the gauge variation is more or less evenly distributed on the mandrel. This even distribution of the gauge variation is achieved by applying a modest amount of oscillatory rotation to the guide cage 10 as the film is drawn through it.

There are many equivalents to the foregoing preferred embodiment which may be employed depending on manufacturing requirements. For example, the support frame 20 can be positioned below or radially beyond the frame 22, rather than above, as depicted. This invention has been described in detail with reference to a selected preferred embodiments, but it should be recognized that the invention is not limited to such embodiment(s). Rather, many modifications and variations will present themselves to persons skilled in the art without departing from the scope and spirit of the invention, as defined in the appended claims.

I claim:

1. An external stabilizer arrangement employed in a plastic film blowing apparatus in which a tubular die, fed with a supply of molten thermoplastic polymer, extrudes a tube of the molten polymer and which injects air into said extruded tube to inflate the tube and expand the tube into a film of a desired thickness, aid wherein means are positioned above said die for drawing the tube vertically upward along a vertical axis and collapsing and flattening the film; and winding the flattened film onto a mandrel; the external stabilizer arrangement comprising an upper frame having a rotary member having an opening through which said extruded tube passes, and structure for rotatably supporting said rotary member;

a lower frame that is suspended from the rotary member of said upper frame, and being positioned such that the lower frame surrounds the extruded tube above the die to keep the tube aligned in a predetermined path as the tube is drawn upwards, and comprising a plurality of arms arranged on said lower frame so as to define an iris aperture having a diameter, wherein each of said arms includes a channel for coolant flow with a portion of said arm being in contact with the extruded tube;

wherein said upper frame includes means for rotating said rotary member and said lower frame over a predetermined are in respect to the axis of said extruded tube, such that the angular positions of the portions of the arms that contact the tube change as the tube passes vertically through the external stabilizer, without changing the diameter of the aperture, so as to compensate for gauge variation in the film.

2. The external stabilizer arrangement according to claim 1, wherein said arms are swing arms that are pivoted on said lower frame to swing toward and away fern the axis of the extruded tube so that the aperture diameter can be adjusted.

3. The external stabilizer arrangement according to claim 1, wherein said means for rotating the rotary member and the lower frame is operative to oscillate the frame over said predetermined arc about said vertical axis.

4. The external stabilizer arrangement to claim 3 wherein said predetermined arc is about 60 degrees.

5. An external stabilizer arrangement employed in a plastic film blowing apparatus in which a tubular die, fed with a supply of molten thermoplastic polymer, extrude a tube of the molten polymer and which injects air into said extruded tube to inflate the tube and expand the tube into a film of a desired thickness, and wherein means are positioned above said die for drawing the tube vertically upward along a vertical axis and collapsing and flattening the film; and winding the flattened film onto a mandrel; the external stabilizer arrangement comprising an upper frame having a ring through which said extruded tube passes, and structure for rotatably supporting said ring;

a lower frame that is suspended from the ring of said upper frame, and being positioned such that the lower frame surrounds the extruded tube above the die to keep the tube aligned in a predetermined path as the tube is drawn upwards, and comprising a plurality of arms arranged on said lower frame so as to define an iris aperture, the iris aperture having a diameter, wherein each of said arms includes a channel for coolant flow with a portion of said arm being in contact with the extruded tube;

wherein said upper frame includes means for rotating said ring and said lower frame over a predetermined arc in respect to the axis of said extruded tube, without changing the diameter of said iris aperture, such that the angular positions of the portions of the arms that contact the tube change as the tube passes vertically through the external stabilizer so as to compensate for gauge variations in the film.

6. The external stabilizer arrangement according to claim 5, further comprising a plurality of threaded rods that are rotatably supported on said upper frame ring and that extend vertically downward therefrom through female threaded receptacles in the lower frame for supporting the same, and means for selectively rotating said threaded rods to change the elevational position of said lower frame.

7. The external stabilizer arrangement according to claim 6, wherein said means for selectively rotating includes a belt drive passing around said ring and rotationally coupled to each of said threaded rods; and a motor driving said belt drive.

8. The external stabilizer arrangement according to claim 5, wherein said means for rotating said ring over a predetermined are includes a belt drive on said structure supporting said ring, and engaging a perimeter of said ring for rotating the same.

9. The external stabilizer arrangement according to claim 5, wherein said arms are swing arms that are pivoted on said lower frame to swing toward and away from the axis of the extruded tube so that the aperture diameter can be adjusted.

10. The external stabilizer arrangement according to claim 5, wherein said means for rotating the lower frame is operative to oscillate the frame about said vertical axis.

11. The external stabilizer arrangement to claim 10 wherein said predetermined are is about 60 degrees.

12. The external stabilizer arrangement according to claim 5 wherein said ring is in the form of an annular channel having a pair of flange walls coaxial with the axis of thee extruded tube, and a flat annular horizontal web member, with the means for supporting said lower frame being located in said flat annular horizontal web member.

13. The external stabilizer arrangement according to claim 12, wherein said means supporting said lower frame includes a plurality of threaded rods rotatably supported on said flat horizontal web member and a extending vertically downward therefrom through female threaded receptacles in the lower frame for supporting the same, and means on said upper frame for selectively rotating said threaded rods to change the elevational position of said lower frame.

14. An external stabilizer arrangement employed in a plastic film blowing apparatus in which a tubular die, fed with a supply of molten thermoplastic polymer, extrudes a tube of the molten polymer and which injects air into said extruded tube to inflate the tube and expand the tube into a film of a desired thickness, and wherein means are positioned above said die for drawing the tube vertically upward along a vertical axis and collapsing and flattening the film; so that the flattened film may be wound onto a mandrel; the external stabilizer arrangement comprising a first frame having a rotary member having an open passage through which said extruded tube passes, and structure for rotatably supporting said rotary member;

a second frame that is suspended from the rotary member of said first frame, and being positioned such that the second frame surrounds the extruded tube above the die to keep the tube aligned in a predetermined path as the tube is drawn upwards, and comprising a plurality of selectively movable arms arranged on said second frame so as to define an iris aperture, the iris aperture having a diameter wherein each of said arms includes a channel for coolant flow with a portion of said arm being in contact with the extruded tube;

wherein said first frame includes means for rotating said member and the entire said second frame over a predetermined arc in respect to the axis of said extruded tube, without changing the diameter of said iris aperture, such that the angular positions of the portions of the arms that contact the tube change as the tube passes vertically through the external stabilizer so as to compensate for gauge variations in the film.

* * * * *

UNITED STATES PATENT AND TRADEMARK OFFICE
CERTIFICATE OF CORRECTION

PATENT NO.    : 6,875,002 B2
DATED         : April 5, 2005
INVENTOR(S)   : Andrew D. Prudhomme It is certified that error appears in the above-identified patent and that said Letters Patent is hereby corrected as shown below:

<u>Column 6,</u>
Line 16, "aid" should read -- and --
Line 35, "are" should read -- arc --
Line 40, "variation" should read -- variations --
Line 43, "fern" should read -- from --
Line 53, "extrude" should read -- extrudes --

<u>Column 7,</u>
Lines 30 and 41, "are" should read -- arc --

<u>Column 8,</u>
Line 1, "thee" should read -- the --
Lines 35-36, insert the word -- rotary -- between "said" and "member"

Signed and Sealed this

Seventh Day of June, 2005

JON W. DUDAS
*Director of the United States Patent and Trademark Office*